United States Patent
Rosen

[15] 3,644,817
[45] Feb. 22, 1972

[54] PLURAL SUPPLY STEPPER MOTOR CONTROL SYSTEM

[72] Inventor: Philip J. Rosen, Oak Park, Mich.

[73] Assignee: The Babcock & Wilcox Company, New York, N.Y.

[22] Filed: June 19, 1969

[21] Appl. No.: 834,750

[52] U.S. Cl. ............................................. 318/696, 318/442
[51] Int. Cl. ................................................... H02v 37/00
[58] Field of Search .............. 318/138, 254, 341, 345, 738 A, 318/440, 20, 860, 910, 415, 442

[56] References Cited

UNITED STATES PATENTS

| | | | |
|---|---|---|---|
| 3,199,009 | 8/1965 | Lien et al. | 318/138 |
| 3,304,480 | 2/1967 | Ko | 318/138 |
| 3,355,646 | 11/1967 | Goto | 313/138 |
| 3,368,128 | 2/1968 | Parrish | 318/138 |
| 3,416,054 | 12/1968 | Galles | 318/138 |
| 3,424,961 | 1/1969 | Leenhouts | 318/138 |
| 3,467,899 | 9/1969 | Inaba et al. | 318/138 X |
| 3,505,579 | 4/1970 | Leenhouts et al. | 318/138 |

Primary Examiner—G. R. Simmons
Attorney—Barnes, Kisselle, Raisch & Choate

[57] ABSTRACT

A stepper motor control system comprising a constant current motor supply for exciting the various phases of the motor and means for converting a bipolar control signal into a unipolar signal which in turn controls the rate of pulses for successively energizing various phases of the motor. The system further includes means responsive to the bipolar signal for controlling the direction of movement of the motor. The constant current supply is responsive to the speed of the motor independently of the pulse rate to change the excitation of the motor from the constant current supply to a low-voltage constant voltage supply when the speed of the motor is reduced below a predetermined value.

3 Claims, 15 Drawing Figures

INVENTOR.
PHILIP J. ROSEN
BY
Barnes, Kisselle, Raisch & Choate
ATTORNEYS

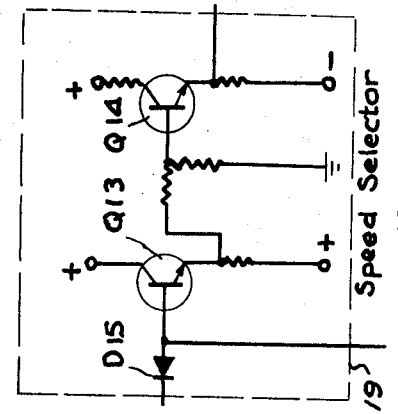
FIG. 6 Speed Selector
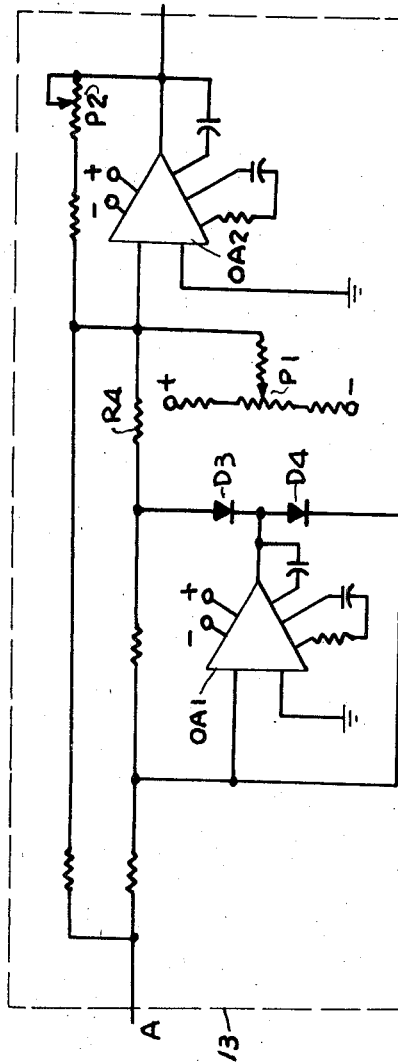
FIG. 5 Precision Absolute Value
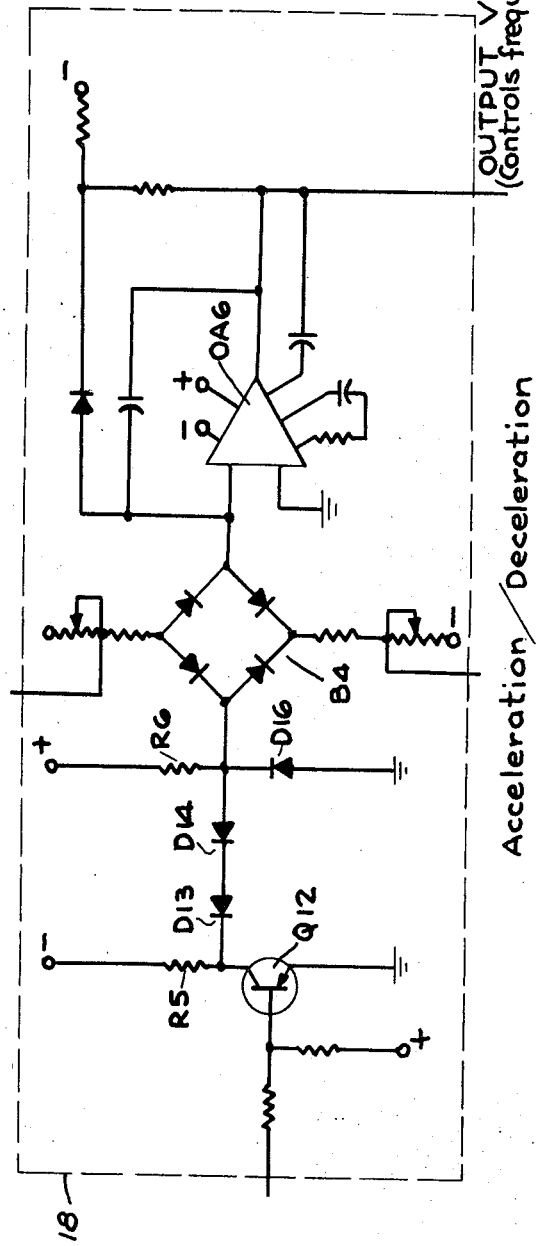
FIG. 7 Acceleration/Deceleration
OUTPUT VOLTAGE (Controls frequency of pulses in 14)
INVENTOR.
PHILIP J. ROSEN
BY
Barnes, Kisselle, Raisch & Choate
ATTORNEYS

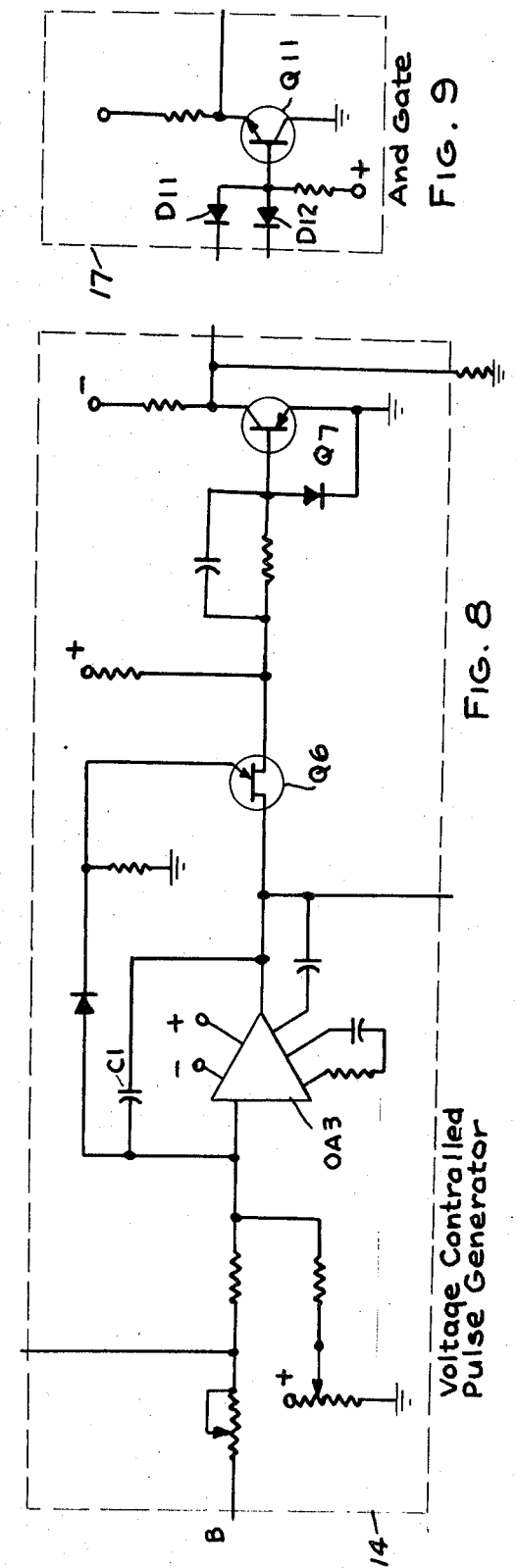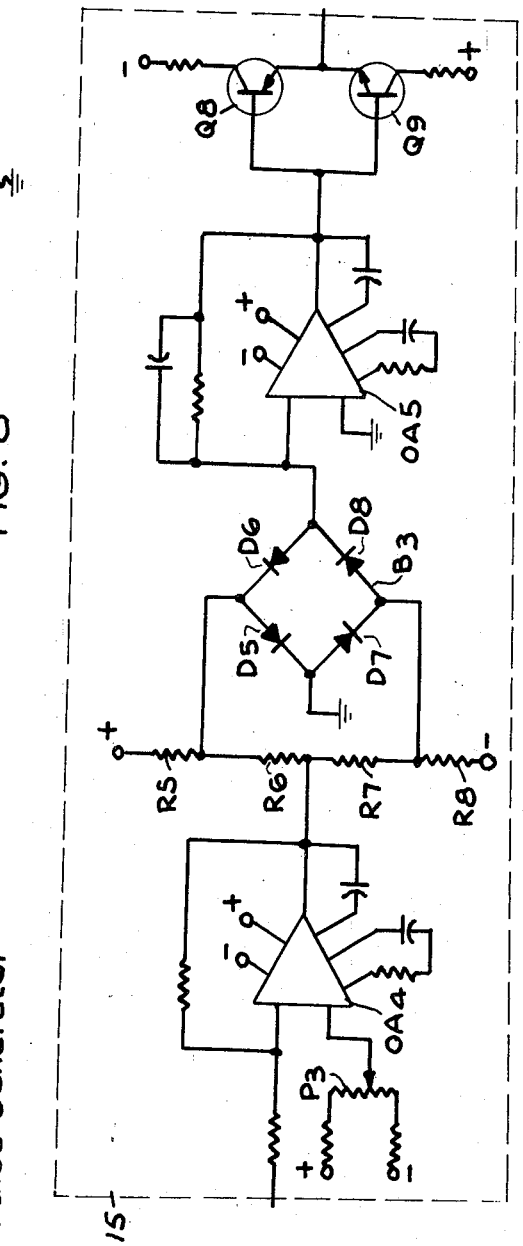

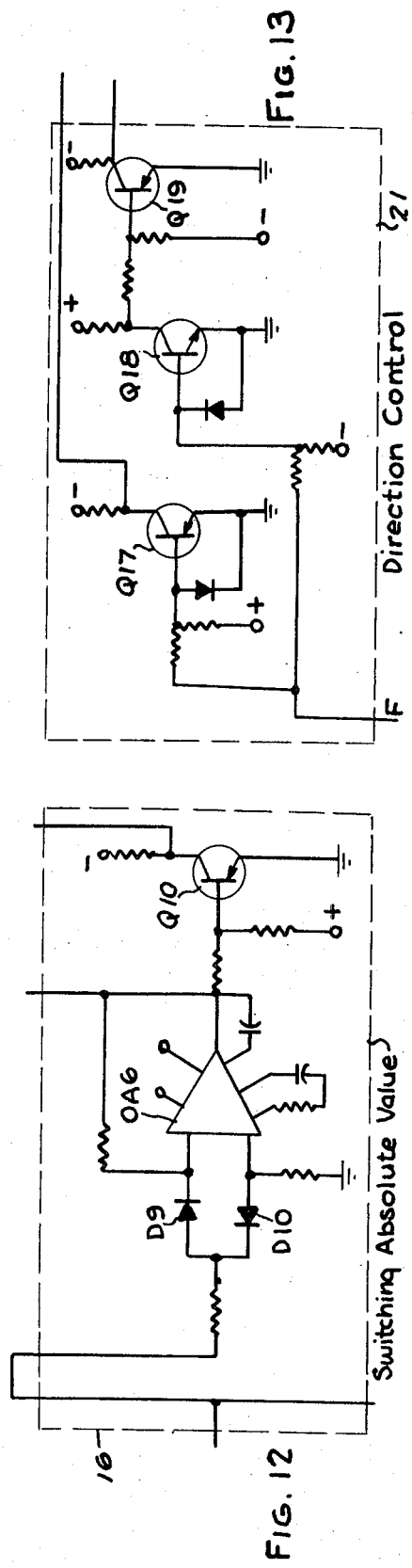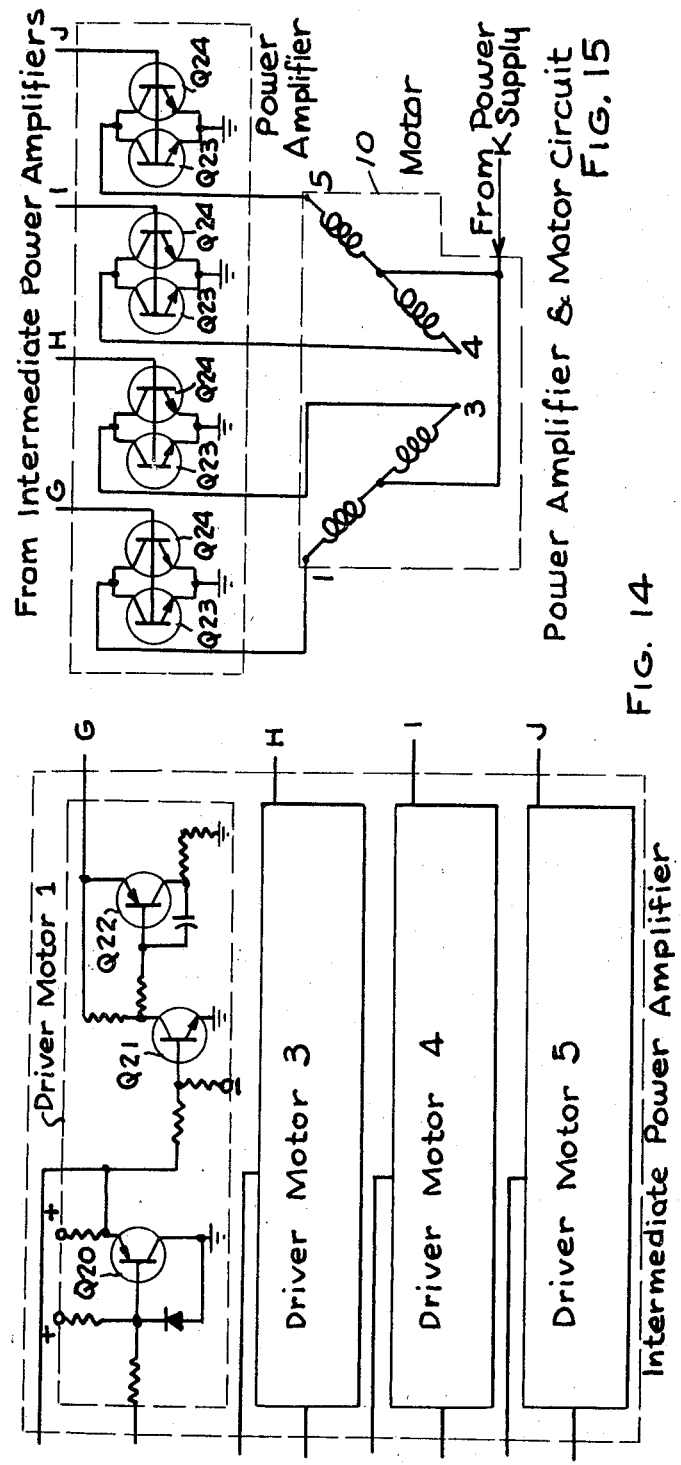

PLURAL SUPPLY STEPPER MOTOR CONTROL SYSTEM

This invention relates to stepper motors and particularly to stepper motor control systems which are to be operated bidirectionally over a continuous variable speed range with relatively constant torque.

BACKGROUND OF THE INVENTION

Stepping motors are used in machinery in which it is desirable to position to certain discrete locations accurately, in which a digital control of position is preferred and in which the motor can be held in a position by applying a current to the windings when stopped. Such motors are usually wound two phase multipole but have permanent magnets on the rotor to ensure locking into the position signal. Such motors are typified by "Slo-Syn," made by Superior Electric Co. of Connecticut and others.

These motors are often used as part of closed loops in which their velocity is the controlled parameter. Examples are found in simulators such as pilot trainers, boresight target controls for gun calibration and similar devices in which the position loop is closed by the human eye and velocity is controlled by a lever manually operated. Another application is in tracing, feeding and wheel dressing on grinding machines and lathes, for instance, in which the velocity of an axis drive is desired to be controlled directly by a template tracer operating a linear variable displacement transformer (LVDT) or a potentiometer.

In the case of such applications, it is usually necessary to be able to control the motor over a very wide speed range, and to be able to change speeds with as little delay as possible. Speed is changed by varying the frequency of the step pulses. It has heretofore been suggested, for example, in the U.S. Pat. to Goto No. 3,355,646 issued Nov. 28, 1967, that the voltage applied to the stepper motor should be changed in response to the frequency of the command or control pulses. Such a system is dependent upon the pulse rate and is not directly related to the actual load upon the stepper motor.

In contrast to the Goto method which takes no account of the tendency of these motors to lose pulses and to stall if the motor acceleration and/or current capability is exceeded, the invention disclosed herein provides constant torque over the entire speed range within which the motor can function. In this way, it has proven possible to get the absolute maximum performance of which the motor is capable by suitably shaping the acceleration-deceleration ramp slopes automatically without any attention from the operator. The result is a true "-feel" control in which the operator or the tracer directs motor speed and in which the system automatically achieves the desired position in an entirely optimum manner.

Among the objects of the invention are to provide a stepper motor control system which will effectively and efficiently control a motor operated bidirectionally over a continuously variable speed range with relatively constant torque over the entire range; wherein a minimum of power is dissipated in the zero speed or braking mode; which utilizes a novel constant current supply; which incorporates a provision for operation only when the initial control signal exceeds a predetermined magnitude; which incorporates provision for preventing a pulse rate more than a predetermined magnitude to be created regardless of the magnitude of the input control signal; and which utilizes a conversion from an analog to a digital system for controlling both the speed and direction of the motor.

SUMMARY OF THE DISCLOSURE

In accordance with the invention, the stepper motor control system utilizes a constant current motor supply for exciting the various phases of the motor and means for converting a bipolar control signal into a unipolar signal which in turn controls the rate of pulses for successively energizing various phases of the motor. The system further includes means responsive to the bipolar signal for controlling the direction of movement of the motor. The constant current supply is responsive to the speed of the motor independently of the pulse rate to change the excitation of the motor from the constant current supply to a low-voltage constant voltage supply when the speed of the motor is reduced below a predetermined value.

DESCRIPTION OF THE DRAWINGS

FIG. 5 is a schematic diagram of the precision absolute value circuit.

FIG. 6 is a schematic diagram of the speed selector circuit.

FIG. 7 is a schematic diagram of the acceleration-deceleration circuit.

FIG. 8 is a schematic diagram of the voltage-controlled pulse generator.

FIG. 9 shows an AND-gate.

FIG. 10 is a schematic diagram of the dead band comparator.

FIG. 12 is a schematic diagram of the switching absolute value circuit.

FIG. 13 is a schematic diagram of the direction control circuit.

FIG. 14 is a schematic diagram of the intermediate power amplifiers.

FIG. 15 is a schematic diagram of the power amplifiers.

GENERAL DESCRIPTION

Figure 1:
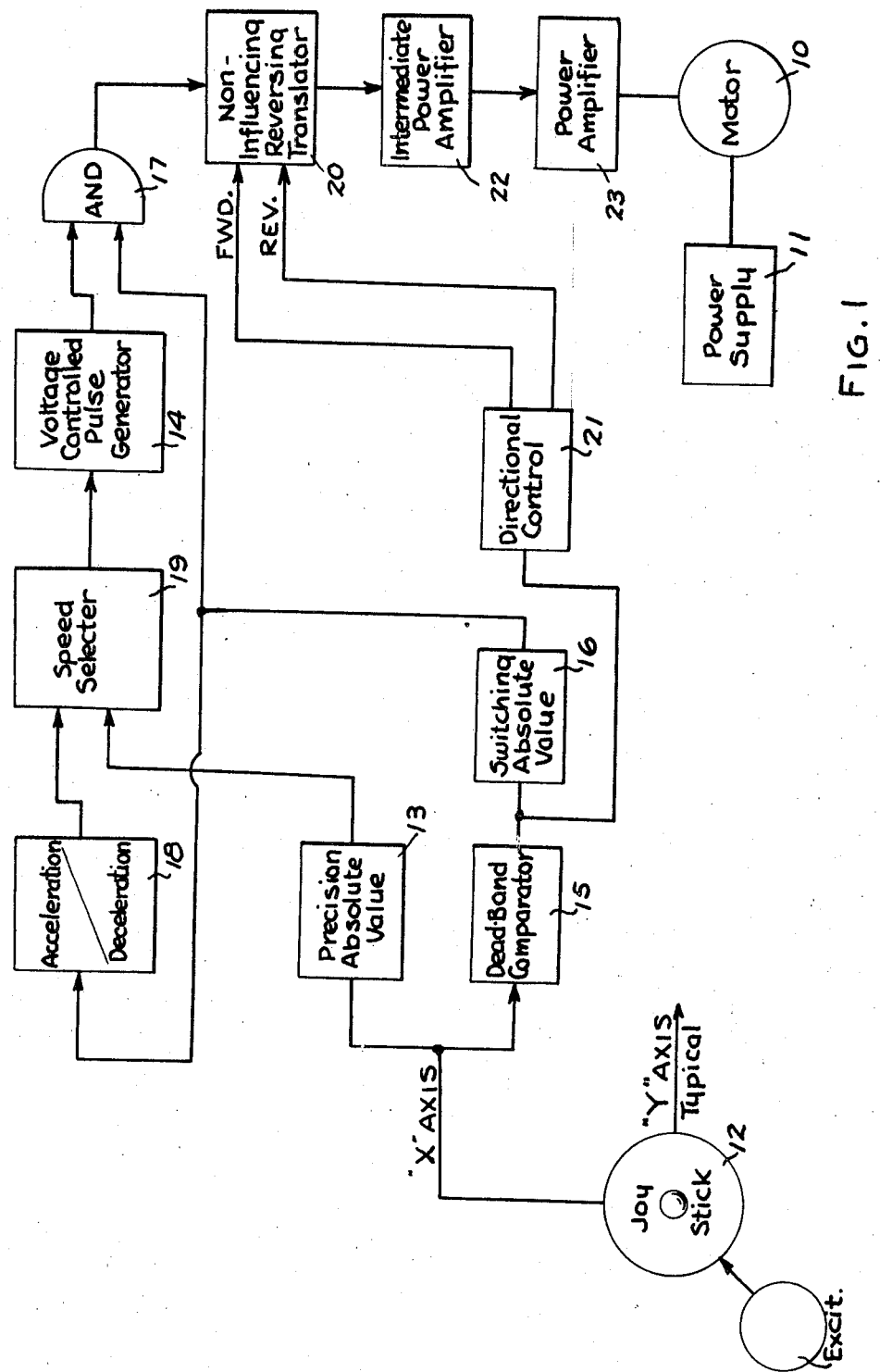
FIG. 1 is a schematic diagram of the stepper control system embodying the invention.

Referring to FIG. 1, the system is adapted to controlling a stepper motor 10, the windings or phases of which are energized from a power supply 11 which, as presently described, is preferably of the constant current type.

Control signals from a signal device 12 produce a bipolar signal utilized for controlling the motor. Control device 12 may also produce a bipolar signal for controlling a second stepper motor for operation in another direction designated in the diagram as the Y axis. For purposes of simplicity the control system for only one stepper motor will be described.

The control device 12 may comprise a linear variable displacement transformer (LVDT) or other similar device for producing a bipolar continuous analog signal.

The analog signal is utilized to perform two functions, namely, first produce a pulse rate which controls the speed of the stepping motor 10, and second, to determine the direction of rotation of the motor 10. The amplitude of the signal controls the stepping rate and the polarity determines the direction of rotation.

Referring to FIG. 1, the bipolar signal from the control 12 is converted by a precision absolute value circuit 13 to a unipolar signal of accurate value. The unipolar signal is then transmitted to a voltage-controlled pulse generator 14 that produces a series of pulses at a frequency corresponding to the magnitude of the unipolar signal from the absolute value circuit 13.

In addition, a dead band comparator 15 compares the magnitude of the bipolar signal from the control 12 and permits a signal to pass only when the magnitude of the bipolar signal is greater than a predetermined value. The dead band comparator 15 thus performs the function of ensuring that the magnitude of the signal is sufficient to overcome any hysteresis or demodulator drift effect within the control 12.

The signal passing from the dead band comparator 15 is converted to an absolute value signal by a switching absolute value circuit 16 and is applied to gate 17 as well as to an acceleration-deceleration circuit 18.

The acceleration-deceleration circuit 18 functions with speed selector 19 to permit a unipolar signal only of maximum predetermined value to pass to voltage control pulse generator 14 thereby preventing the pulse generator from producing pulses at a rate greater than a predetermined value.

If there is a signal from both the precision absolute value circuit 13 and the switching absolute value circuit 16, the AND-gate 17 functions to permit the passage of the pulses from the voltage-controlled pulse generator 14 to pass to the noninfluencing reversing translator 20. The noninfluencing reversing translator 20 functions to control the timing of the pulses from the pulse generator in the proper sequence to provide for operation of the motor 10 in a forward or reverse direction. The translator 20 is controlled from a directional control 21 which receives the bipolar signal from the dead band comparator 15. The output from the translator 20 is amplified by amplifiers 22, 23 to excite the various phases of motor 10 in the proper sequence so that the motor is driven in the proper direction and at the proper rate determined by the bipolar signal from the control 12.

MOTOR POWER SUPPLY

In order to operate the motor at a constant torque over a wide range of speeds, for example, on the order of 50:1 speed range, special design features are necessary. For instance, over a 3:1 range, a constant voltage supply could ordinarily be used. This cannot be done over a wider range because the back EMF of the motor, which is inextricably associated with speed, will mask the control range of the supply. Instead, a constant current supply is provided with sufficient voltage compliance to maintain a preset current over the entire speed (and back EMF) range. Since the system spends the majority of the operating time stopped (the region of maximum power dissipation), it is also necessary to provide means to limit power loss during this time.

Figure 2:
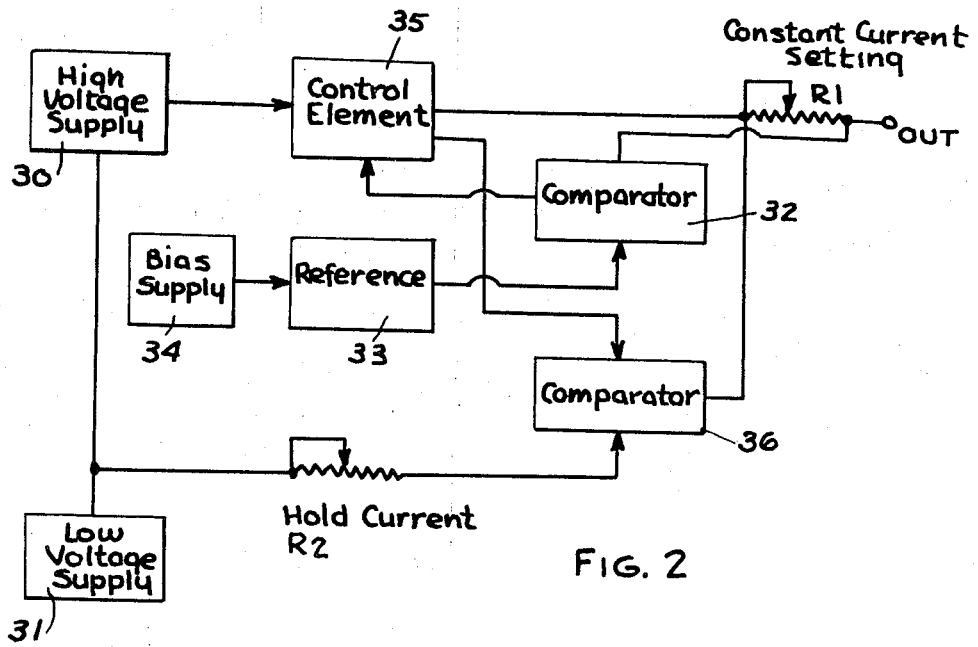
FIG. 2 is a schematic diagram of the power supply which is utilized in the system.

Referring to FIG. 2, voltage across the constant current setting resistor R1 is compared by a comparator 32 with a reference voltage from a reference source 33 driven by unregulated supply 34. Comparator 32 functions to modulate control element 35 in order to maintain a constant current output. As a result the power supply supplies all the current requirements over the running range of the stepper motor without being dependent on the pulse rate, thus tending to maintain constant torque output from the motor over the entire speed range.

However, utilizing the constant current supply in the holding or braking mode of operation will cause continuous dissipation of maximum power in control element 35. Since the motor is in the holding mode a majority of the time, this method of operation is undesirable.

Accordingly, a comparator 36 is provided which compares the voltage produced by the counter EMF of the motor so that when the voltage is reduced as the motor decelerates, the current supply 30 is disconnected and only the low-voltage supply 31 is provided to supply current to the motor. The constant current setting is provided by an adjustable resistance R1 while the holding current setting is adjustable by an adjustable resistor R2.

Figure 3:
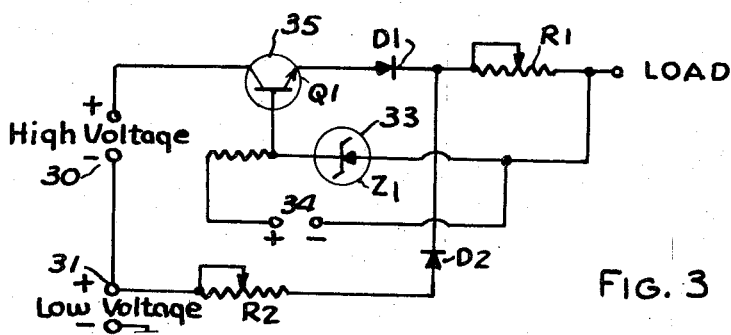
FIG. 3 is a simplified wiring diagram of the power supply utilized in the system.

A simplified wiring diagram of the power supply shown in FIG. 2 is set forth in FIG. 3 wherein the control element 35 comprises NPN-transistor Q1, the reference 33 comprises zener diode Z1 which cooperates with the control element 35 and constant current setting resistor R1 to provide the function of comparator 32. The function of comparator 36 in FIG. 2 is provided in FIG. 3 by diodes D1 and D2. When the counter EMF of the motor decreases as the motor decelerates, the voltage at the anode of diode D1 becomes slightly less positive than at the cathode of diode D2, diode D1 will cut off due to its reverse bias and thereby disconnect the high-voltage supply which had been providing the constant current to the load. In its place the low-voltage supply will provide a constant and uncontrolled voltage for producing a holding current through diode D2 and resistor R1 to the motor.

Figure 4:
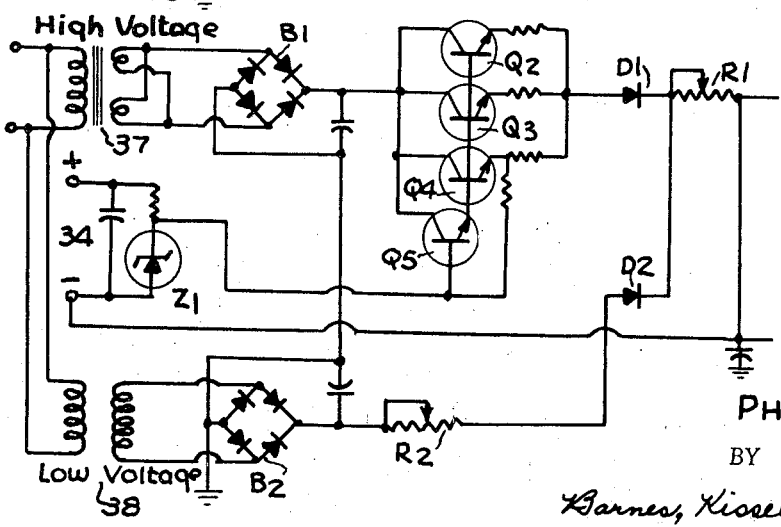
FIG. 4 is a detailed wiring diagram of the power supply utilized in the system.

A more complete wiring diagram of the power supplies in FIGS. 2 and 3 is shown in FIG. 4 wherein the high-voltage supply is provided by a transformer 37 and bridge B1. The low-voltage supply is provided by a transformer 38 and bridge B2. The control function of control element 35 in FIG. 2 or transistor Q1 in FIG. 3 is provided in FIG. 4 by transistors Q2, Q3 and Q4 connected in parallel. Transistor Q5 serves as a Darlington-connected driver. Bias supply 34 is merely indicated and may be a transformer-rectifier or a battery.

PRECISION ABSOLUTE VALUE CIRCUIT

The precision absolute value circuit 13 may be of the type shown in FIG. 5 and provides a positive signal, independent of the input signal polarity, but accurately proportional to the input signal amplitude. It is used to control the rate at which motor control pulses are generated. The circuit comprises operational amplifiers OA1 and OA2 connected in series.

Either a positive or negative signal may appear at point A, the input to the precision absolute value circuit. In the case of a negative input, the operational amplifier OA1 is effectively not in the circuit by the action of diode D4. In the case of a positive input, the operational amplifier OA1 has a negative gain and its signal is impressed on resistor R4 which is one input of summing operational amplifier OA2. The second input terminal of this summing operational amplifier OA2 is connected directly to the circuit input A. For the direct connection, the summer OA2 has a negative gain. For the indirect connection through the first operational amplifier OA1, it has the same negative gain. However, operational amplifier OA1 has a gain of −2 times the gain of summer OA2. Thus, for a positive input signal, the overall gain is positive, being the negative of the sum of gains of −2x and +1x from OA2 and OA1, respectively. Therefore, the output signal for either a positive or negative input will be positive. Potentiometer P1 introduces a zero-setting input voltage. P2 is the overall gain adjustment.

VOLTAGE CONTROLLED PULSE GENERATOR

The voltage controlled pulse generator 14 may be of the type shown in FIG. 8 and generates a pulse train whose frequency is directly proportional to the magnitude of the input voltage, over a range of about 50:1. The circuit comprises an operational amplifier OA3 connected as an integrator, a unijunction transistor Q6 and an amplifier stage Q7.

The operational amplifier OA3 is connected as an integrator such as to drive constant charging current through the capacitor C1 for any given value of input voltage at B. Unijunction transistor Q6 is connected across the capacitor C1 so as to short out capacitor C1 when its standoff voltage (voltage at which standoff ratio is exceeded) has been exceeded. The capacitor C1 will now recharge at a rate corresponding to input voltage at B to the standoff voltage, and will continue this cycle as long as the input voltage remains constant. The frequency of this cycle is therefore a function of the input voltage level at point B. The output signal (a pulse train) from the unijunction transistor Q6 is shaped using the amplifier stage Q7.

DEAD BAND COMPARATOR

The dead band comparator 15 may be of the type shown in FIG. 10 and accepts the joystick input and regeneratively amplifies it, obtaining positive or negative saturation (depending on the sign of the input) at a threshold point. This threshold, which is the dead band voltage of the system, is required to suppress hysteresis in the joystick or other input transducer. The circuit comprises an operational amplifier OA4 which is connected so that it acts as an inverting amplifier only. P3 is a zero offset control, as above. The amplifier is associated with a diode bridge B3, the output of which in turn passes to operational amplifier OA5 and transistors Q8 and Q9 which are connected as a buffer amplifier.

Operational amplifier OA4 acts as an inverting amplifier only. The dead band comparator is a symmetrical circuit which can operate on either positive or negative signals. In the case of the negative input, which would use the upper half of the voltage divider R5, R6, R7, R8 and diodes D5 and D6 of bridge B3, resistors R5 and R6 determine the trigger point of the amplifier OA4 for negative signals. When the input is of high enough magnitude, diode D5 which had been conducting to ground previously will cut off and diode D6 will conduct causing the entire circuit to become a high-gain inverting amplifier. For positive input signals, the operation is identical except that resistors R7, R8 and diodes D7, D8 will now be activated as described above. When the input signal is within the dead band (both diodes D5 and D7 are conducting), the operational amplifier OA5 assumes the role of a voltage follower with a gain of 1 and, since its noninverting input is at ground, its output will be at ground (zero volts). Transistors Q8 and Q9 act as a buffer amplifier for the dead band comparator output

SWITCHING ABSOLUTE VALUE CIRCUIT

The switching absolute value circuit 16 may be of the type shown in FIG. 12, accepting either positive, negative or zero input from the dead band comparator 15 and converting it to standard digital binary levels for use in gating. The following table is employed.

| Input | Output |
| --- | --- |
| +Saturation | 1 |
| 0 | 0 |
| −Saturation | 1 |

The gating output controls the AND-gate 17 and the acceleration-deceleration circuit 18. The circuit 16 comprises an operational amplifier OA6 and a buffer amplifier Q10.

The inputs to this circuit are either positive or negative saturation from the dead band comparator 15. For positive input, the signal is switched through diode D9 into the inverting input of the operational amplifier OA6 thus causing a negative output. For a negative input, the signal is switched through diode D10 into the noninverting input also causing a negative output signal. Transistor Q10 acts as a buffer amplifier for this signal.

AND-GATE

The AND-gate 17 may be of the type shown in FIG. 9 and comprises a NPN-transistor Q11 and associated diodes D11 and D12. The AND-gate 17 allows the voltage-controlled pulse generator output to drive later elements in the system only if the input voltage is greater than the threshold value.

ACCELERATION-DECELERATION CIRCUIT

The acceleration-deceleration circuit 18 can be of the type shown in FIG. 7 and limits and controls the rate of change of motor speed. If too great an acceleration (or deceleration—the phenomena are quite symmetrical) is called for, torque in excess of that available from the motor will be required, in which case the motor will either stall or lose pulses. The acceleration-deceleration circuit 18 comprises a PNP-transistor Q12 and associated diodes D13, D14 and D16 connected to a diode bridge B4, the output of which in turn is connected to the inverting input of operational amplifier OA6.

The acceleration-deceleration circuit is an operational integrator whose output is clamped at ground for negative-going signals. The diode switching bridge B4 selects the proper integrator timing resistor as a function of the polarity of the plus or minus voltage input switching signals at the junction of diodes D14 and D16. Q12 functions as the switch. The output of operational amplifier OA6 is a voltage which determines the instantaneous pulse frequency out of the voltage-controlled pulse generator 14. The circuit provides for constant acceleration and deceleration within low tolerances.

SPEED SELECTION CIRCUIT

The speed selection circuit 19 compares the desired acceleration and deceleration for accurate start and stop with the slope of the actual signal coming from the precision absolute value circuit 13 so as to override the operator, if necessary. The speed selection circuit may be of the type shown in FIG. 6 and comprises a diode D15 and NPN-transistors Q13, Q14 connected as cascaded emitter followers.

NONINFLUENCING REVERSING TRANSLATOR

Figure 11:
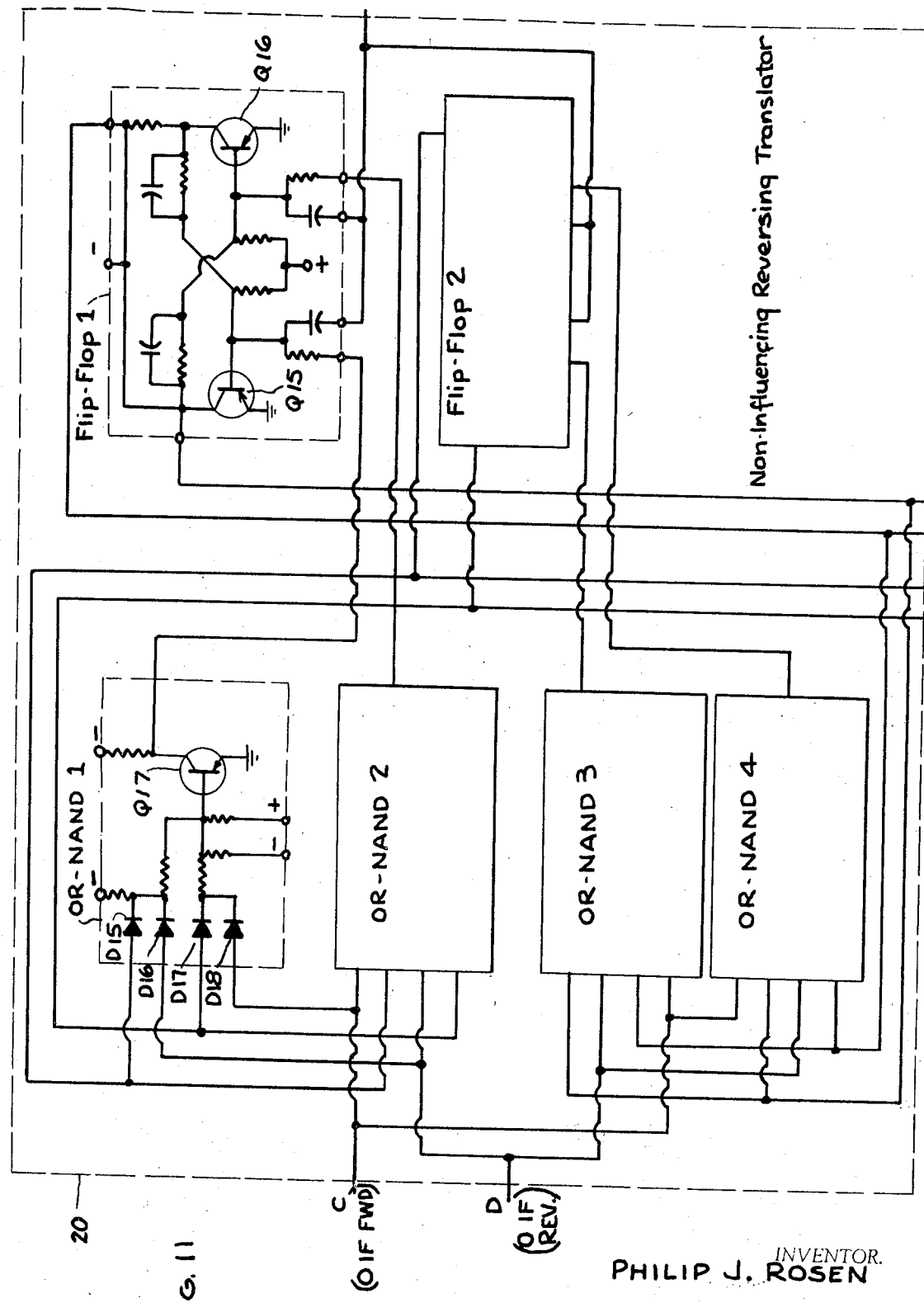
FIG. 11 is a block diagram of the noninfluencing reversing translator.

The noninfluencing reversing translator 20 may be of the type shown in FIG. 11 and converts a serial pulse train into a group of four gray (cyclic) coded signals so sequenced as to drive the motor in the desired direction at a speed controlled by the frequency of the input pulse train. The output line sequence is dictated by the specification of the manufacturer. The translator 20 comprises flip-flops FF1 and FF2 which are connected to a series of OR-NAND-gates 1–4 that in turn are controlled by the positive or negative signal from the control 12.

The function of the OR-NAND-gates 1–4 is to provide the correct steering signals for the two translator flip-flops FF1 and FF2 in response to the forward and reverse commands derived from points C and D in order to cause the motor to go in either forward or reverse direction.

As shown in FIG. 11, each flip-flop comprises PNP-transistors Q15 and Q16 connected in an RST (reset-set-trigger) configuration. Each OR-NAND-gate comprises diodes D15, D16, D17, D18 and a PNP-transistor Q17.

DIRECTION CONTROL

The direction control circuit 21 functions in conjunction with the reversing translator 20, takes the ternary positive saturation-zero-negative saturation signal from the dead band comparator 15, and produces a two-line binary pair output. The circuit 21 may be of the type shown in FIG. 13 including PNP-transistor Q17, NPN-transistor Q18, and PNP-transistor Q19. The circuit is driven by the dead band comparator 15 and will produce a forward or reverse command when driven by a positive or negative input, respectively, at point F.

INTERMEDIATE POWER AMPLIFIER

The intermediate power amplifier comprises a plurality of drivers, one for each motor winding, and may be of the type shown in FIG. 14 including transistors Q20, Q21 and Q22 interconnected to form each driver motor circuit.

POWER AMPLIFIER

Power amplifier may be of the type shown in FIG. 13 including coupled transistor pairs Q23, Q24. It provides adequate power to drive the motor. The outputs G, H, I, J of the intermediate power amplifiers are directed to the transistors Q24 for successively energizing the windings of the motor in accordance with the sequence for forward or reverse travel as directed by the translator 20. It will be observed that a single power supply suffices to drive all motor winding and connection.

I claim:

1. In a stepper motor control system, the combination comprising a stepper motor, means for producing pulsations at a suitable power level for each winding of said stepper motor, means for changing the sequence of excitation of the windings of the stepper motor in response to command pulses, a power source for exciting the windings of the stepper motor, means responsive to the counter electromotive force of the motor for maintaining a constant current from said power source, said power source comprising a high-voltage constant current source for exciting the windings of said stepper motor, a low-voltage, constant voltage source for exciting the windings of said stepper motor, and means responsive to the speed of the motor for exciting said windings from said constant current source when the speed of the motor is above a predetermined amount and from said constant voltage source only when the speed of the motor is below a predetermined value.

2. The combination set forth in claim 1 wherein said last-mentioned means comprises means responsive to the counter electromotive force of the motor to effect operation of the motor from the constant voltage source when the counter electromotive force is reduced below a predetermined value.

3. In a stepper motor control system, the combination comprising a stepper motor, means for producing pulsations at a suitable power level for each winding of said stepper motor, means for changing the sequence of excitation of the windings of the stepper motor in response to command pulses, a power source for exciting the windings of the stepper motor, means responsive to the counter electromotive force of the motor for maintaining a constant current from said power source, said power source comprising a high-voltage constant current source for exciting the windings of said stepper motor, a low-voltage, constant voltage source for exciting the windings of said stepper motor, a pair of diodes and means for providing a reference voltage, said diodes being connected for comparing the counter electromotive force with the voltage bias of one of the diodes to connect the diode in the circuit.

* * * * *